United States Patent [19]

Tajiri et al.

[11] Patent Number: 5,153,301

[45] Date of Patent: Oct. 6, 1992

[54] POLYESTER RESIN FOR TONER

[75] Inventors: Noriyuki Tajiri, Toyohashi; Hirokazu Ito, Nagoya; Masayuki Takyu, Toyohashi; Ryo Funato, Nagoya; Shinji Kubo, Toyohashi, all of Japan

[73] Assignee: Mitsubishi Rayon Company Ltd., Tokyo, Japan

[21] Appl. No.: 811,619

[22] Filed: Dec. 23, 1991

Related U.S. Application Data

[63] Continuation-in-part of Ser. No. 443,484, Nov. 30, 1989, abandoned.

[30] Foreign Application Priority Data

Dec. 1, 1988 [JP] Japan .................. 63-304425

[51] Int. Cl.$^5$ .............................................. C08G 63/20
[52] U.S. Cl. .................... 528/272; 528/176; 528/194; 528/195; 528/300; 528/305; 528/308; 528/308.6; 430/99
[58] Field of Search ............... 528/176, 194, 195, 272, 528/300, 305, 308, 308.6; 430/99

[56] References Cited

U.S. PATENT DOCUMENTS

| | | | |
|---|---|---|---|
| 4,314,049 | 2/1982 | Yasuda | 528/128 |
| 4,387,211 | 6/1983 | Yasuda et al. | 63/18 |
| 4,533,614 | 8/1985 | Fukumoto et al. | 430/99 |
| 4,725,664 | 2/1988 | Halmess et al. | 528/176 |
| 4,849,495 | 7/1989 | Funato et al. | 528/194 |

FOREIGN PATENT DOCUMENTS

| | | |
|---|---|---|
| 0291059 | 11/1988 | European Pat. Off. . |
| 0312691 | 4/1989 | European Pat. Off. . |
| 0320819 | 6/1989 | European Pat. Off. . |
| 2198141 | 6/1988 | United Kingdom . |

OTHER PUBLICATIONS

Patent Abstracts of Japan, vol. 6, No. 54 (C-97) [932], Apr. 9, 1982, & JP-A-56 167 767 (Toyo Boseki K.K.) Dec. 23, 1981.

Patent Abstracts of Japan, vol. 13, No. 424 (P-934) [3772], Sep. 21, 1989; & JP-A-1 155 361 (Kao Corp.) Jun. 19, 1989.

Patent Abstracts of Japan, vol. 13, No. 424 (P-924) [3772], Sep. 21, 1989; & JP-A-1 155 360 (Kao Corp.) Jun. 19, 1989.

Patent Abstracts of Japan, vol. 12, No. 110 (C-486) [2957], Apr. 8, 1988; & JP-A-62 236 871 (Toray Ind. Ind) Oct. 16, 1987.

*Primary Examiner*—Morton Foelak
*Assistant Examiner*—Sam A. Acquah
*Attorney, Agent, or Firm*—Oblon, Spivak, McClelland, Maier & Neustadt

[57] ABSTRACT

A polyester resin comprised of (a) units derived from a terephthalic acid component and/or a isophthalic acid component, (b) 0 to 80 mole %, based on the total carboxylic acid component, of units derived from a diol component represented by the formula:

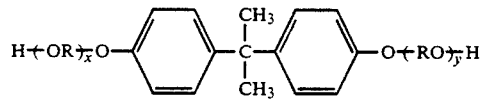

wherein R represents an alkyl group having 2 or 3 carbon atoms, and x and y are integers satisfying the requirement of $2 \leq x+y \leq 6$, and (c) 20 to 200 mole %, based on the total carboxylic acid component, of units derived from an aliphatic diol component. The polyester has a weight average molecular weight $M_w$ of 3,000 to 20,000, a number average molecular weight $M_n$ of 1,000 to 10,000, a glass transition temperature $T_g$ of 40° to 70° C., and a softening temperature of 70° to 130° C. The polyester is valuable for a toner.

6 Claims, No Drawings

POLYESTER RESIN FOR TONER

CROSS-REFERENCE TO RELATED APPLICATION

This is a continuation-in-part of an application Ser. No. 443,484, filed Nov. 30, 1989, abandoned.

BACKGROUND OF THE INVENTION

1. Field of the Invention

This invention relates to a polyester resin valuable for a toner to be used for the development of statically charged images in an electrophotographic process, an electrostatic recording process, an electro-static printing process and the like. More particularly, it relates to a polyester resin having an excellent blocking resistance, melt flow characteristics and fixing property, and especially valuable for a toner suitable for full-color reproduction where a high melt flowability is required, and for the development in a high-speed copying machine or high-speed printer where a low-temperature fixing property is required, and further for a powder paint.

2. Description of the Related Art

In the process for obtaining a permanent visible image from a statically charged image, the statically charged image formed on a photoconductive photosensitive material or electrostatic recording material is developed with a toner triboelectrically charged in advance and the developed image is fixed. The fixation is performed by directly fusion-bonding the toner image obtained by the development onto the photoconductive photosensitive material or electrostatic recording material, or by transferring the toner image onto a paper or sheet and fusion-bonding the toner image to the transfer sheet. Fusion bonding of the toner image is effected by contact with a vapor of a solvent, pressurization or heating. The heat-fixing method includes a non-contact heating method using an electric oven or flash and a press-heating method using a heating roller. To cope with recent requirements for an increased fixing speed, the latter method is preferably adopted.

In the process for obtaining a color image, toners of three to four colors are applied to a transfer sheet at the above-mentioned developing step, and coloration and fixation are effected while melting and mixing the respective toners at the fixing step. A resin having a good mixing property at the fixing step, that is, a resin having a good melt flowability, is urgently required as the binder for a full-color toner. If a binder having a good melt flowability is used, a problem of an occurrence of an offset phenomenon at the fixing step arises, but if the binder is crosslinked or the molecular weight of the binder is increased, to prevent the offset phenomenon, the melt flowability becomes poor and the binder is not suitable for a full-color toner. Accordingly, a method of preventing the occurrence of an offset phenomenon, which comprises coating a silicone on the surface of a fixing roller of a copying machine, is currently adopted.

At present, an increase of the operation speed in the fixing zone and a realization of energy-saving are urgently required, and in a copying machine other than a full-color copying machine, and a printer, a method is often adopted in which the occurrence of an offset phenomenon is prevented by coating a silicone on a fixing roller.

The use of a low-molecular-weight resin composed of a divalent unsaturated carboxylic acid and an aromatic diol component as a toner resin has been proposed, but since the reactivity of the aromatic diol component with an unsaturated carboxylic acid component is low, to obtain a resin having the desired physical properties, it is necessary to carry out the reaction at a high temperature. If the reaction is carried out at a high temperature, however, the aromatic diol is decomposed and a bad smell is generated and the image quality is poor.

Furthermore, the aromatic diol is relatively expensive, and the use of a toner formed by using a large quantity of the aromatic diol is not preferable from the economical viewpoint during the current popularity of copying machines.

Moreover, since an unsaturated carboxylic acid is used as the divalent carboxylic acid, hydroquinone or the like should be used as an agent for preventing the radical reaction, and the use of this radical reaction-preventing agent can produce environmental pollution.

Under these circumstances, a low-molecular-weight toner suitable for full-color reproduction with a good fixing property, which has a good melt flowability, good heat stability and good polymerization reactivity, is urgently required.

SUMMARY OF THE INVENTION

A primary object of the present invention is to provide a resin binder for a toner, which has a low softening temperature and an excellent melt flowability, fixing property and blocking resistance. This resin is especially valuable for use as a toner for a full-color copying machine, high-speed copying machine or high-speed printer wherein a high melt flowability and a good low-temperature fixing property are required, or as a binder for a powder paint.

In accordance with the present invention, there is provided a polyester resin for a toner, which comprises (a) units derived from at least one dicarboxylic acid component selected from the group consisting of terephthalic acid components and isophthalic acid components, (b) 0% to 80% by mole, based on the total carboxylic acid component, of units derived from a diol component represented by the following formula [I]:

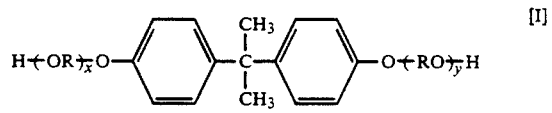

wherein R represents an alkyl group having 2 or 3 carbon atoms, and x and y are integers satisfying the requirement of $2 \leq X+Y \leq 6$.

and (C) 20% to 100% by mole, based on the total carboxylic acid component, of units derived from an aliphatic diol component, and which has a weight average molecular weight $M_w$ of 3,000 to 20,000, a number average molecular weight $M_n$ of 1,000 to 10,000, a glass transition temperature $T_g$ of 40 to 70° C., and a softening temperature of 70° to 130° C.

DESCRIPTION OF THE PREFERRED EMBODIMENTS

In the present invention, by the term terephthalic acid component" we mean a component derived from terephthalic acid or a lower alkyl ester thereof having 1 to 4 carbon atoms in the alkyl group, and by the term "isophthalic acid component" we mean a component derived from isophthalic acid or a lower alkyl ester thereof having 1 to 4 carbon atoms in the alkyl group. The terephthalic acid component effectively improves the glass transition temperature $T_g$ and blocking resistance of the polyester, and the isophthalic acid component effectively controls the polymerization reactivity and the softening temperature of the polyester.

As specific examples of the diol component of formula [I] used in the present invention, there can be mentioned polyoxypropylene(n)-polyoxyethylene(n')-2,2-bis(4-hydroxyphenyl)propane, polyoxypropylene(n)-2,2-bis(4-hydroxyphenyl)propane, polyoxyethylene(n)-2,2-bis(4-hydroxyphenyl)propane and polyoxyethylene(n)-2,2-bis(4-hydroxyphenyl)propane. Among them, polyoxypropylene(n)-2,2-bis(4-hydroxyphenyl)propane in which each of n and n' is a number of from 2.1 to 2.5 is especially preferable. This diol component is advantageous in that, by using this diol component, the glass transition temperature of the polyester is improved and the reaction is easily controlled. Nevertheless, the diol component is easily heat-decomposed as a high temperature, and thus use of the diol component in combination with the aromatic dicarboxylic acid requiring a high reaction temperature is difficult. Therefore, the amount of the diol component used is limited to 0% to 80% by mole, preferably up to 70% by mole, based on the total carboxylic acid component.

As specific examples of the aliphatic diol used in the present invention, there can be mentioned ethylene glycol, diethylene glycol, 1,2-butanediol, 1,3-butanediol, 1,4-butanediol, neopentyl glycol and propylene glycol. The aliphatic diol increases the rate of polycondensation reaction. Among the foregoing aliphatic diols, ethylene glycol, neopentyl glycol and butanediol are preferably used in view of the fixing property. The aliphatic diol is used in an amount of 20% to 100% by mole, preferably at least 30% by mole, based on the total carboxylic acid component.

A monomer other than (a) the terephthalic acid component and isophthalic acid component, (b) the diol represented by formula [I] and (c) the aliphatic diol component can be copolycondensed with these monomers in an amount of up to 10% by mole based on the polyester, as long as the characteristic properties of the polyester are not degraded.

It is important that the polyester resin for a toner according to the present invention should have a weight average molecular weight $M_w$ of 3,000 to 20,000, a number average molecular weight $M_n$ of 1,000 to 10,000, a glass transition temperature $T_g$ of 40° to 70° C., and a softening temperature of 70° to 130° C.

If the weight average molecular weight $M_w$ is lower than 3,000, the glass transition temperature $T_g$ is drastically reduced and the blocking resistance becomes poor although the melt flowability and fixing property of the resin are improved. If the weight average molecular weight $M_w$ exceeds 20,000, the melt flowability and fixing property of the resin become poor. Accordingly, the weight average molecular weight $M_w$ should be 3,000 to 20,000, preferably 3,000 to 15,000.

The number average molecular weight $M_n$ should be 1,000 to 10,000, preferably 2,000 to 7,500, in correspondence to the above-mentioned weight average molecular weight $M_w$.

A good blocking resistance is obtained if the glass transition temperature $T_g$ is 40° to 70° C. In general, if an inorganic powder such as silica is incorporated into the toner the blocking resistance is improved, and this improvement is especially conspicuous when the glass transition temperature $T_g$ of the binder is low. If the glass transition temperature $T_g$ is 40° to 70° C., a good blocking resistance can be obtained even if the inorganic powder is not added. If the glass transition temperature $T_g$ is lower than 40° C., the blocking resistance becomes very poor, although the fixing property is good, and even if the inorganic powder is incorporated, the blocking resistance is not improved. If the glass transition temperature $T_g$ is higher than 70° C., the fixing property becomes poor. The glass transition temperature $T_g$ is preferably 50° to 65° C.

If the softening temperature is lower than 70° C., reduction of the glass transition temperature $T_g$ is conspicuous and the blocking resistance becomes poor, although the melt flowability and fixing property are good. If the softening temperature is higher than 130° C., the melt flowability and fixing property becomes poor, and therefore, the resin is not suitable as a binder for a full-color toner or a toner for a high-speed copying machine.

The polyester resin of the present invention can be synthesized by a usual polyester-forming process in which the dicarboxylic acid component and diol component are subjected to esterification reaction or ester exchange reaction, and then polycondensation is carried out while removing the low-boiling-point diol component by distillation. A known polymerization catalyst, for example, titanium tetrabutoxide dibutyltin oxide, tin acetate, zinc acetate, tin disulfide, antimony trioxide or germanium dioxide, can be used for the polycondensation.

The molecular weight of the polyester resin is closely related to the reaction time of the polycondensation for the preparation thereof, and where the reaction time is long, the molecular weight of the resulting resin is high. In the present invention, as hereinbefore mentioned, it is necessary to adjust the reaction time to thereby obtain a resin having a weight average molecular weight $M_w$ of 3,000 to 20,000 and a number average molecular weight $M_n$ of 1,000 to 10,000. If the molecular weight is too large, the flowability of the resin becomes poor and a drawback arises in that, where the resin is used for a full color toner, for example, it is difficult to satisfactorily mix the colorants of three original colors with the resin.

The polyester resin of the present invention can be used for a dry toner, alone or in combination with another toner resin. Even if the polyester resin of the present invention is blended with another toner resin, the fixing property of the toner is improved without a lowering of the blocking resistance. The polyester resin of the present invention can be used not only as a toner binder but also for a powder paint.

In the present invention, the softening temperature means the temperature at which ½ of 1 g of a sample flows out when the measurement is carried out at a constant temperature-elevating rate of 3° C./min under a load of 30 kgf by using a nozzle having an orifice diameter of 1 mm and a length of 10 mm in a flow tester, Model CFT-500 supplied by Shimadzu Corp.

The glass transition temperature $T_g$ is the temperature at the intersection point of the base line of the chart and the tangential line on the endothermic curve in the vicinity of $T_g$, observed when the measurement is carried out at a temperature-elevating rate of 5° C./min by using a differential scanning calorimeter.

The weight average molecular weight $M_w$ and number average molecular weight $M_n$ are those determined by using a gel permeation chromatograph, Model HCL-8200 supplied by Tosoh Corp.

The present invention will now be described in detail with reference to the following examples, that by no means limit the scope of the invention.

In the examples, the indicated melt flowability and blocking resistance were evaluated as follows.

Melt Flowability

A polyester resin powder having a particle size of 5 to 20 μm was spread on a polyvinyl chloride sheet to form a layer and fixed by passing a roller heated to 160° C. and having a surface coated with a silicone oil, over the polyester powder layer at a speed of 300 mm/sec. The sheet was projected onto a screen through an overhead projector, and the degree of light transmittance was visually observed. Where the melt flowability of the resin is high, the resin is uniformly spread on the sheet surface and the light is easily transmitted through the resin layer. Where the melt flowability of the resin is low, the resin is not uniformly spread and the resin layer has an uneven surface, and thus the light is scattered to form shadows. The degree of light transmittance was visually evaluated under the following three criteria.
A. Light is easily transmitted.
B. Light is slightly scattered.
C. Light is scattered to form shadows.

Blocking Resistance

A polyester resin powder having a particle size of 5 to 20 μm was introduced into a sample bottle and allowed to stand at 40° C. for 24 hours. Then, the degree of blocking was visually evaluated under the following five criteria.
A. No blocking appears.
B. Very slight blocking appears but is eliminated by weak shaking.
C. Slight blocking appears but is substantially eliminated by strong upward and downward shaking.
D. Blocking appears. The blocking can be broken when pressed with a finger but does not disappear.
E. Strong blocking appears. The blocking cannot be broken by being pressed with a finger.

EXAMPLE 1

Terephthalic acid, isophthalic acid, ethylene glycol, neopentyl glycol and polyoxypropylene(2.3)-2,2-bis(4-hydroxyphenyl)propane were charged at ratios shown in Table 1-1 into a reaction vessel, and antimony trioxide was added as the polymerization catalyst in an amount of 400 ppm based on the dicarboxylic acid component. An esterification reaction was carried out under atmospheric pressure at an inner temperature of 230° C., while stirring at 200 rpm. Then the pressure was gradually reduced to 1.0 mmHg over a period of 40 minutes at an inner temperature of 240° C., while stirring at 200 rpm. Under this reduced pressure, ethylene glycol was removed by distillation. The softening temperature was traced, and the point at which the softening temperature reached a desired level was designated as the point of termination of the polycondensation. Then, the pressure of the reaction system was elevated to atmospheric pressure to complete the polymerization and obtain a light yellow solid. The results of the analysis of the composition of the resin and the results of the measurement of the physical properties are shown in Table 1-2 and Table 1-3.

TABLE 1-1

| | Charged amounts (molar parts) | | | | |
|---|---|---|---|---|---|
| | Dicarboxylic acid component | | Diol component | | |
| Resin | Terephthalic acid | Isophthalic acid | Diol A* | Ethylene glycol | Neopentyl glycol |
| A | 50 | 50 | 50 | 70 | — |
| B | 100 | — | 50 | 70 | — |
| C | — | 100 | 50 | 70 | — |
| D | 50 | 50 | 30 | 90 | — |
| E | 50 | 50 | 50 | 70 | — |
| F | 50 | 50 | 50 | 70 | — |
| G | 50 | 50 | 45 | 40 | 45 |
| H | 50 | 50 | 40 | — | 90 |

TABLE 1-2

| | *2 Resin composition (mole %) | | | | | physical properties | | | |
|---|---|---|---|---|---|---|---|---|---|
| | Dicarboxylic acid component | | Diol component | | | | softening | | |
| Resin | Terephthalic acid | Isophthalic acid | *1 Diol A | Ethylene glycol | Neopentyl glycol | $T_g$ (°C.) | temperature (°C.) | $M_w$ | $M_n$ |
| A | 50 | 50 | 50 | 50 | — | 56.0 | 108 | 9,000 | 4,300 |
| B | 100 | — | 49 | 51 | — | 59.0 | 108 | 9,100 | 4,330 |
| C | — | 100 | 50 | 50 | — | 51.0 | 109 | 9,500 | 4,520 |
| D | 49 | 51 | 29 | 71 | — | 49.0 | 108 | 9,000 | 4,400 |
| E | 51 | 49 | 50 | 50 | — | 58.0 | 120 | 18,000 | 8,600 |
| F | 51 | 49 | 46 | 54 | — | 49.0 | 94 | 4,000 | 1,950 |
| G | 50 | 50 | 45 | 11 | 44 | 56.5 | 108 | 9,000 | 4,400 |
| H | 51 | 49 | 40 | — | 60 | 55.6 | 110 | 11,000 | 5,000 |

Note
*1: diol A is polyoxypropylene(2.3)-2,2-bis(4-hydroxyphenyl)propane.
*2: the total amount of the dicarboxylic acid components is regarded as 100% by mole and the total amount of the diol components is regarded as 100% by mole.

TABLE 1-3

| Resin | Melt flowability | Blocking resistance |
|---|---|---|
| A | A | A |
| B | A | A |
| C | A | B |
| D | A | B |
| E | B | A |
| F | A | B |
| G | A | A |
| H | A | A |

In view of the data of the weight average molecular weight $M_w$ and softening temperature shown in Table 1-2, it is seen that resins A through H have good melt flowability, mixing property and smoothness, and that when these resins A through H are used for a color toner, a good image sharpness is obtained, and when they are used for a usual toner, a good fixing property is obtained. Furthermore, from the data of the glass transition temperature $T_g$ shown in Table 1-2, it is seen that resins A through H have an excellent blocking resistance.

EXAMPLE 2

Dimethyl terephthalate, dimethyl isophthalate, ethylene glycol and polyoxypropylene(2.3)-2,2-bis(4-hydroxyphenyl)propane were charged in amounts shown in Table 2-1 in a reaction vessel, and titanium tetrabutoxide was added as the polymerization catalyst in an amount of 500 ppm based on the dicarboxylic acid components. Then the pressure was gradually reduced to 1.0 mmHg over a period of 40 minutes at an inner temperature of 200° C., while stirring at 200 rpm, and under this reduced pressure, ethylene glycol was removed by distillation. The softening temperature was traced, and the point at which the softening temperature reached a desired level was designated as the point of termination of the polycondensation. Then, the pressure of the reaction system was elevated to atmospheric pressure to complete the polymerization.

TABLE 2-1

| | Charged amounts (molar parts) | | | |
|---|---|---|---|---|
| | Dicarboxylic acid components | | Diol components | |
| Resin | Dimethyl terephthalic | Dimethyl isophthalic | Diol A* | Ethylene glycol |
| I | 50 | 50 | 70 | 50 |
| J | 100 | — | 20 | 100 |

The obtained resin was a yellowish red solid. The results of the analysis of the composition of the resin and the results of the measurement of the physical properties are shown in Table 2-2.

TABLE 2-2

| | *2 Resin composition (mole %) | | | | physical properties | | | |
|---|---|---|---|---|---|---|---|---|
| | Dicarboxylic acid component | | Diol component | | | Softening | | |
| Resin | Dimethyl terephthalate | Dimethyl isophthalate | *1 Diol A | Ethylene glycol | $T_g$ (°C.) | temperature (°C.) | $M_w$ | $M_n$ |
| I | 51 | 49 | 71 | 29 | 60.0 | 102 | 8,500 | 4,100 |
| J | 100 | — | 20 | 80 | 59.4 | 108 | 9,500 | 4,300 |

Note
*1: diol A is polyoxypropylene(2.3)-2,2-bis(4-hydroxyphenyl)propane.
*2: the total amount of the dicarboxylic acid components is regarded as 100% and the total amount of the diol components is regarded as 100%.

Then the resin I was melt-kneaded with a resin X for a usual toner at a mixing ratio shown in Table 2-3 by using an extruder to obtain a resin K or M. The softening temperature and glass transition temperature $T_g$ of the obtained resin is shown in Table 2-3.

TABLE 2-3

| Resin | Blending ratio (% by weight) | Softening temperature (°C.) | $T_g$ (°C.) |
|---|---|---|---|
| X | X = 100 | 142 | 60.5 |
| K | X/I = 90/10 | 138 | 60.0 |
| L | X/I = 80/20 | 135 | 60.0 |

From Table 2-3, it is seen that a resin formed by blending the low-molecular-weight polyester into the toner resin X has a lower softening temperature than that of the toner resin X, while retaining the $T_g$ at the same level. This means that the resins I and J have an improved low-temperature fixing property compared to the resin X without a lowering of the blocking resistance.

Note, the melt kneading was carried out at 150° C. and 50 rpm by using a conical type twin-screw extruder supplied by Haake Buchler Instrumentals, Inc.

Further, the obtained melt flowability and blocking resistance of the resins are shown in Table 2-4.

TABLE 2-4

| Resin | Melt flowability | Blocking resistance |
|---|---|---|
| I | A | A |
| J | A | A |
| X | C | A |
| K | C | A |
| L | C | A |

COMPARATIVE EXAMPLE 1

Terephthalic acid, isophthalic acid, ethylene glycol and polyoxypropylene(2.3)-2,2-bis(4-hydroxyphenyl)-propane were charged in amounts shown in Table 3-1 in a reaction vessel, and antimony trioxide was added as the polymerization catalyst in an amount of 500 ppm based on the dicarboxylic acid components. The polycondensation was carried out in the same manner and under the same conditions as in Example 1, to obtain a light yellow solid M, N or O. The results of the analysis of the composition of the resin and the results of the measurement of the physical properties are shown in Table 3-2 and Table 3-3.

TABLE 3-1

| | Charged amount (molar parts) | | | |
|---|---|---|---|---|
| | Dicarboxylic acid component | | Diol component | |
| Resin | Terephthalic acid | Isophthalic acid | *1 Diol A | Ethylene glycol |
| M | 50 | 50 | 95 | 20 |
| N | 50 | 50 | 50 | 70 |
| O | 50 | 50 | 20 | 120 |

TABLE 3-2

| | *2 Resin composition (mole %) | | | | physical properties | | | |
|---|---|---|---|---|---|---|---|---|
| | Dicarboxylic acid component | | Diol component | | | Softening | | |
| Resin | Terephthalic acid | Isophthalic acid | *1 Diol A | Ethylene glycol | $T_g$ (°C.) | temperature (°C.) | $M_w$ | $M_n$ |
| M | 49 | 51 | 94 | 6 | 38.2 | 95 | 2,200 | 1,000 |

TABLE 3-2-continued

| Resin | *2 Resin composition (mole %) | | | | physical properties | | | |
|---|---|---|---|---|---|---|---|---|
| | Dicarboxylic acid component | | Diol component | | | Softening | | |
| | Terephthalic acid | Isophthalic acid | *1 Diol A | Ethylene glycol | $T_g$ (°C.) | temperature (°C.) | $M_w$ | $M_n$ |
| N | 51 | 49 | 50 | 50 | 36.1 | 81 | 2,400 | 1,100 |
| O | 50 | 50 | 19 | 81 | 69.5 | 140 | 40,000 | 18,500 |

Note
*1: diol A is polyoxypropylene(2.3)-2,2-bis(4-hydroxyphenyl)propane.
*2: the total amount of the dicarboxylic acid components is regarded as 100% by mole and the total amount of the diol components is regarded as 100% by mole.

TABLE 3-3

| Resin | Melt flowability | Blocking resistance |
|---|---|---|
| M | A | D |
| N | A | E |
| O | C | A |

From Table 3-2, it is seen that in the resin M, since the diol A is used in a large amount, the $T_g$ is lowered and the blocking resistance is poor, although the melt flowability and fixing property are good. In this case, since a large amount of the diol A having a poor reactivity was used, the polycondensation was conducted for 18 hours, but the $T_g$ was not elevated. Furthermore, when the polymerization temperature was elevated to 270° C., a large quantity of the decomposition product of the diol A was distilled off.

From Table 3-2, it is seen that the resin N has a low $T_g$ and poor blocking resistance, although the melt flowability and fixing property are good.

From Table 3-2, it is also seen that the resin O has a weight average molecular weight $M_w$ of 40,000, a high glass transition temperature $T_g$, and a good blocking resistance, but the softening temperature is high and is not suitable for a toner to be used in the field wherein a high melt flowability and high fixing property are required. Moreover, the resin O had a poor adaptability to pulverization.

EXAMPLE 3

Following substantially the same procedure as mentioned in Example 1, a mixture of 100 parts by mole of terephthalic acid, 70 parts by mole of ethylene glycol and 60 parts by mole of neopentyl glycol was subjected to esterification reaction to obtain a resin composed of 100% by mole of terephthalic acid units, 42% by mole of ethylene glycol units and 58% by mole of neopentyl glycol units. This resin had the following physical properties.

$T_g$: 58.6° C.
$M_w$: 12,000
$M_n$: 5,800
Softening temperature: 110° C.
Melt flowability: A
Blocking resistance: A The polyester resin of the present invention has a softening temperature and an excellent melt flowability, fixing property and blocking resistance. Accordingly, the polyester resin of the present invention is very valuable as a resin binder for a toner, and an image formed by using a toner comprising the polyester resin of the present invention has a high sharpness.

COMPARATIVE EXAMPLE 2

The procedure in Comparative Example 1 of U.S. Pat. No. 4,849,495 to Funato et al. was repeated to obtain the resin R9. The results of the analysis of the composition of the resin and the results of the measurement of the physical properties are shown in Table 4 below. The results of the resins A, E, F and N are also shown in Table 4 for the purpose of comparison.

TABLE 4

| | | R9 | A | E | F | N |
|---|---|---|---|---|---|---|
| | | Polyester composition (% by mole) | | | | |
| Acid component | Terephthalic acid | 50 | 50 | 51 | 51 | 51 |
| | Isophthalic acid | 50 | 50 | 49 | 49 | 49 |
| Alcohol component | Aromatic diol | 50 | 50 | 50 | 46 | 50 |
| | Ethylene glycol | 50 | 50 | 50 | 54 | 50 |
| Reaction time (min)* | | 360 | 90 | 180 | 40 | 25 |
| | | Physical properties | | | | |
| Tg (°C.) | | 65 | 56.0 | 58.5 | 49.0 | 36.1 |
| Softening temperature (°C.) | | 129 | 108 | 120 | 94 | 81 |
| Mw | | 27,300 | 9,000 | 18,000 | 4,000 | 2,400 |
| Mn | | 13,500 | 4,300 | 8,600 | 1,950 | 1,100 |
| Melt flowability | | C | A | B | A | A |
| Blocking resistance | | A | A | A | B | D |

Note
*The reaction time is a time from the point at which the pressure reached 1.0 mmHg to that at which the indicated softening temperature was attained.

We claim:
1. A polyester resin for a toner, which consisting essentially of
    (a) units derived from at least one dicarboxylic acid component selected from the group consisting of terephthalic acid components and isophthalic acid components, (b) 0% to 80% by mole, based on the total carboxylic acid component, of units derived from a diol component represented by the following formula [I]:

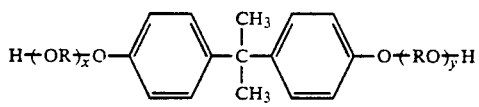

wherein R represents an alkyl group having 2 or 3 carbon atoms, and x and y are integers satisfying the requirement of $2 \leq x+y \leq 6$, and (c) 20% to 100% by mole, based on the total carboxylic acid component, of units derived from an aliphatic diol component, and which has a weight average molecular weight $M_w$ of 3,000 to 20,000, a number average molecular weight $M_n$ of 1,000 to 10,000, a glass transistion temperature $T_g$ of 40° to 70° C., and a softening temperature of 70° to 130° C.

2. The polyester resin according to claim 1, wherein the diol component (b) represented by formula [I] is polyoxypropylene(n)-2,2-bis(4-hydroxyphenyl)propane wherein n is a number of 2.1 to 2.5, and the amount of the units derived therefrom is up to 70% by mole, based on the total carboxylic acid component.

3. The polyester resin according to claim 1, wherein the aliphatic diol component is selected from the group consisting of ethylene glycol, neopentyl glycol and butanediol and the amount of the units derived therefrom is at least 30% by mole based on the total carboxylic acid component.

4. The polyester resin according to claim 1, which has a weight average molecular weight $M_w$ of 3,000 to 15,000, a number average molecular weight $M_n$ of 2,000 to 7,500, and a glass transition temperature $T_g$ of 40° to 70° C.

5. The polyester resin according to claim 1, which has a glass transition temperature $T_g$ of 40° to 60° C.

6. The polyester resin according to claim 1, which has a softening temperature of 70° to 120° C.

* * * * *